(12) United States Patent
Liu

(10) Patent No.: US 8,643,290 B2
(45) Date of Patent: Feb. 4, 2014

(54) FLAT PANEL DISPLAY, LIGHT EMITTING MODULE FOR USE IN FLAT PANEL DISPLAY, AND INTEGRATED CIRCUIT FOR USE IN LIGHT EMITTING MODULE

(75) Inventor: Jing-Meng Liu, Zhubei (TW)

(73) Assignee: Richtek Technology Corporation, Chupei, Hsin-Chu (TW)

( * ) Notice: Subject to any disclaimer, the term of this patent is extended or adjusted under 35 U.S.C. 154(b) by 315 days.

(21) Appl. No.: 13/096,421

(22) Filed: Apr. 28, 2011

(65) Prior Publication Data

US 2011/0273101 A1 Nov. 10, 2011

Related U.S. Application Data

(60) Provisional application No. 61/331,936, filed on May 6, 2010.

(51) Int. Cl.
*H05B 37/02* (2006.01)
(52) U.S. Cl.
USPC .......................................... 315/192; 315/307
(58) Field of Classification Search
USPC .............. 315/185 R, 192, 291, 294, 297, 307
See application file for complete search history.

(56) References Cited

U.S. PATENT DOCUMENTS

| | | | | |
|---|---|---|---|---|
| 8,169,161 | B2 * | 5/2012 | Szczeszynski et al. | 315/308 |
| 2007/0146051 | A1 * | 6/2007 | Tsen | 327/536 |
| 2011/0309758 | A1 * | 12/2011 | Yu et al. | 315/192 |
| 2012/0188487 | A1 * | 7/2012 | Hagino et al. | 349/69 |
| 2013/0009556 | A1 * | 1/2013 | Szczeszynski et al. | 315/185 R |
| 2013/0082603 | A1 * | 4/2013 | Hsu et al. | 315/122 |

\* cited by examiner

*Primary Examiner* — Don Le
(74) *Attorney, Agent, or Firm* — Tung & Associates

(57) ABSTRACT

The present invention discloses a flat panel display (FPD), a light emitting module for use in the FPD, and an integrated circuit for use in the light emitting module. The light emitting module includes: at least one light emitting device string; and a local circuit for controlling current through the light emitting device string and generating a local feedback signal, wherein the local circuit has a first terminal for receiving power, a second terminal for coupling to the light emitting device string to control the current through the light emitting device string, a third terminal for generating the local feedback signal, and a fourth terminal for coupling to ground. The wiring of the FPD is therefore simplified.

23 Claims, 13 Drawing Sheets

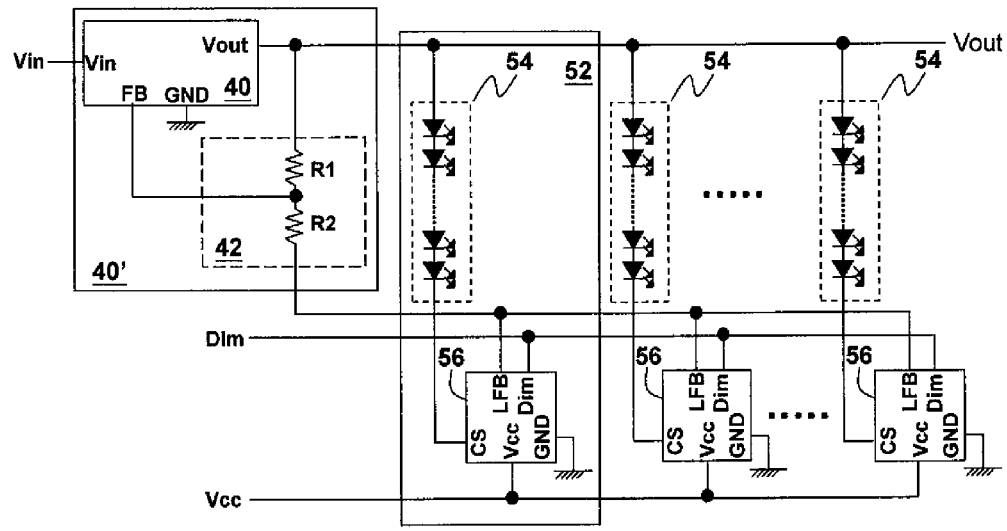
Fig. 5
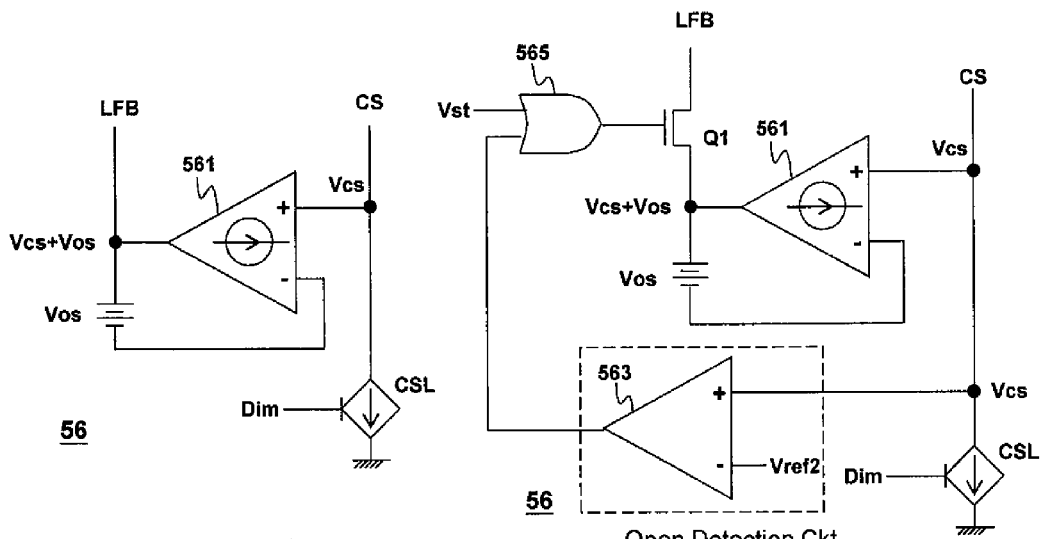
Fig. 6A
Fig. 6B

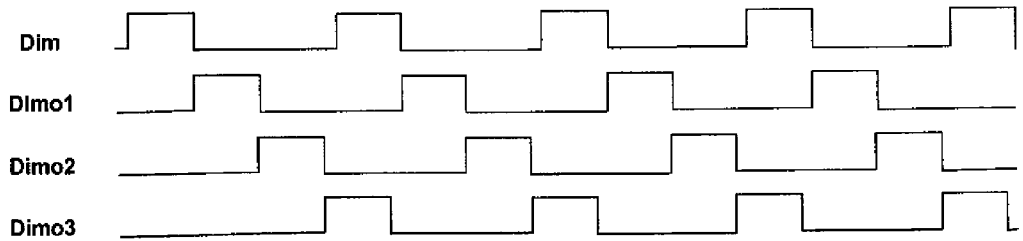
Fig. 9
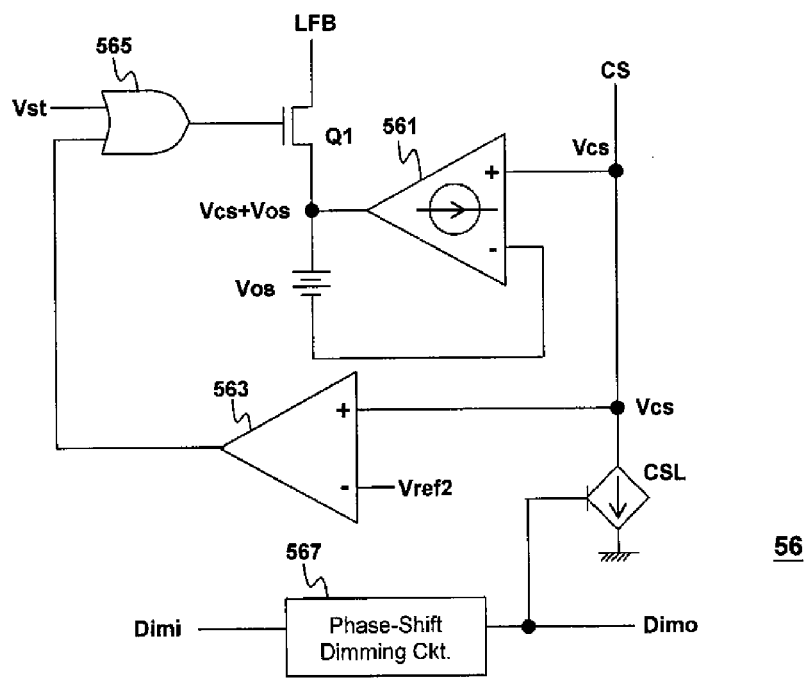
Fig. 10
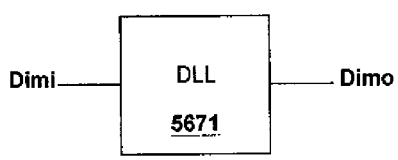 
Fig. 11          Fig. 12

$d\% = a/b$, $Vref4 = (1-d\%)Vref$, $Vref5 = (d\%)Vref$

FLAT PANEL DISPLAY, LIGHT EMITTING MODULE FOR USE IN FLAT PANEL DISPLAY, AND INTEGRATED CIRCUIT FOR USE IN LIGHT EMITTING MODULE

CROSS REFERENCE

The present invention claims priority to U.S. provisional application No. 61/331,936, filed on May 6, 2010.

BACKGROUND OF THE INVENTION

1. Field of Invention

The present invention relates to a flat panel display (FPD), a light emitting module for use in the FPD, and an integrated circuit for use in the light emitting module; particularly, it relates to a FPD, a light emitting module for use in the FPD, and an integrated circuit for use in the light emitting module with simplified wiring.

2. Description of Related Art

FIG. 1 shows a conventional FPD, which includes a display module 10 for displaying an image; a power management circuit 20, which converts an input voltage Vin to an output voltage Vout according to a feedback signal; and multiple light emitting device strings 32 for illuminating the display module 10. Each light emitting device string 32 includes multiple light emitting devices connected in series. One end of each light emitting device string 32 is coupled to the output voltage Vout for receiving power; the other end thereof is coupled to the power management circuit 20 for adjusting current through the light emitting device string 32, and generating the feedback signal accordingly. In some applications, the brightness of the light emitting device strings 32 is adjustable; in such case, the power management circuit 20 receives a dimming signal Dim, and adjusts the brightness of the light emitting device strings 32 according to the dimming signal Dim.

The power management circuit 20 may be as shown in FIG. 2. As shown in the figure, the power management circuit includes a voltage converter circuit 21, an error amplifier circuit 23, a minimum voltage selection circuit 25, and multiple current sources 27. The voltage converter circuit 21 receives a feedback control signal Vc from the error amplifier circuit 23, and the voltage converter circuit 21 converts the input voltage Vin to the output voltage Vout according to the feedback control signal Vc. The error amplifier circuit 23 receives a minimum voltage Vmin, and compares the minimum voltage Vmin with a reference voltage Vref1 to output the feedback signal Vc. The minimum voltage selection circuit 25 receives N current sense signals CS1, CS2, CS3, . . . , CSN, and generates the minimum voltage Vmin according to the N current sense signals CS1, CS2, CS3, . . . , CSN. The multiple current sources 27 are coupled to a first to an Nth different light emitting device strings 32, i.e., L1, L2, L3, . . . , LN, respectively, to control current through respective light emitting device strings 32 (L1, L2, L3, . . . , LN).

The power management circuit 20 may also be as shown in FIG. 3, wherein the transistors and resistors of the current sources 27 are provided outside the integrated circuit chip 23, but the function and operation thereof are the same as the circuit shown in FIG. 2. In this arrangement, the chip 23 needs three pins for each current source 27, that is, voltage signal pins LED1, LED2, . . . , LEDn, control signal pins Gate1, Gate2, . . . , Gaten, and current sense pins Sense1, Sense2, . . . , Sensen.

In the aforementioned conventional FPDs, regardless whether the current sources 27 are provided inside or partially outside the chip, each light emitting device string 32 needs to be coupled to the power management circuit 20 individually. The larger the size of the FPD is, the more the light emitting device strings 32 are needed in number, and so are the number and length of wires required for connection. This means more complicate wiring and more space in need. For example, as shown in FIG. 1, N light emitting device strings 32 require N+1 wires. Besides, if the light emitting devices are connected in series in one light emitting device string 32 by a larger number, a higher operation voltage is required, which leads to higher manufacturing cost and safety concern. Furthermore, when the number of the light emitting device string 32 or the number of the light emitting devices in one light emitting device string 32 changes, the power management circuit 20 and the wiring need to be modified correspondingly. These changes and modifications lead to a higher manufacturing cost.

In view of the foregoing, the present invention provides a FPD, a light emitting module for use in the FPD, and an integrated circuit for use in the light emitting module with a simplified wiring, as solutions to the aforementioned problems.

SUMMARY OF THE INVENTION

The first objective of the present invention is to provide a FPD.

The second objective of the present invention is to provide a light emitting module for use in the FPD.

The third objective of the present invention is to provide an integrated circuit for use in a light emitting module.

To achieve the objectives mentioned above, from one perspective, the present invention provides an FPD, comprising: a display module for displaying an image; a power management circuit, which converts an input voltage to an output voltage according to a feedback signal; a plurality of light emitting modules for illuminating the display module, each light emitting module including: at least one light emitting device string, each light emitting device string having one or more light emitting devices connected in series, and each light emitting device string having a first end and a second end, wherein the first end is coupled to the output voltage for receiving power; and a local circuit for controlling current through the light emitting device string and generating a local feedback signal, wherein the local circuit has a first terminal for receiving power, a second terminal for coupling to the second end of the light emitting device string to control the current through the light emitting device string, a third terminal for generating the local feedback signal, and a fourth terminal for coupling to ground; wherein the local feedback signal of each light emitting module is coupled to a first node for providing the feedback signal at the first node; and a common wiring cluster including: an output voltage common wire for delivering the output voltage; a feedback signal common wire for delivering the feedback signal; and a ground common wire; wherein each light emitting module is electrically coupled to each of the common wires.

The aforementioned local circuit preferably receives a dimming signal for adjusting current through the light emitting device string. In one preferred embodiment, the local circuit may output a phase-shifted dimming signal generated by phase-shifting the dimming signal.

In one preferred embodiment, the local circuit may output a local fault signal to indicate a fault condition, wherein the local fault signal of each light emitting module is coupled to a second node.

In another preferred embodiment, the local circuit further receives serial data for adjusting an internal parameter of the local circuit.

From another perspective, the present invention provides a light emitting module for use in an FPD. The light emitting module includes: at least one light emitting device string, each light emitting device string having one or more light emitting devices connected in series, and each light emitting device string having a first end and a second end, wherein the first end is coupled to the output voltage for receiving power; and a local circuit for controlling current through the light emitting device string and generating a local feedback signal, wherein the local circuit has a first terminal for receiving power, a second terminal for coupling to the second end of the light emitting device string to control the current through the light emitting device string, a third terminal for generating the local feedback signal, and a fourth terminal for coupling to ground.

From another perspective, the present invention provides an integrated circuit for use in a light emitting module for connecting to at least one light emitting device string. The integrated circuit includes: a current source for controlling current through the light emitting device string via a node; and a sink-only voltage follower, which generates a local feedback signal according to a voltage at the node.

In one preferred embodiment, the aforementioned integrated circuit may further include an open detection circuit, which compares the voltage at the node with a first reference voltage (or as an equivalent alternative, a first trip-point voltage) to determine whether the light emitting device string is open-circuited.

In another preferred embodiment, the aforementioned integrated circuit may further include a short detection circuit, which compares the node voltage with a second reference voltage (or as an equivalent alternative, a second trip-point voltage) to determine whether the light emitting device string is short-circuited.

In another preferred embodiment, the aforementioned integrated circuit may further include a phase-shift dimming circuit, which receives a dimming signal and generates a phase-shifted dimming signal by phase-shifting the dimming signal.

In another preferred embodiment, the aforementioned integrated circuit may further include a serial data bus decoder or a one-wire data bus decoder for receiving and decoding serial data, the serial data being for adjusting at least an internal parameter of the integrated circuit.

The objectives, technical details, features, and effects of the present invention will be better understood with regard to the detailed description of the embodiments below.

BRIEF DESCRIPTION OF THE DRAWINGS

FIG. 5 shows a schematic diagram of a power management circuit 40 and multiple light emitting modules 52 of the first embodiment.

FIGS. 6A and 6B show a more specific embodiment of a local circuit 56.

FIG. 9 for example shows signal waveforms of dimming signals Dim, Dimo1, Dimo2, and Dimo3 shown in FIG. 8.

FIG. 10 shows a more specific embodiment of the local circuit 56 shown in FIG. 7.

FIG. 11 shows a phase-shift dimming circuit 567, which for example may include a delay locked loop (DLL) 5671.

FIG. 12 shows the phase-shift dimming circuit 567, which for example may include a pulse width (PW) mirror 5673.

DESCRIPTION OF THE PREFERRED EMBODIMENTS

Figure 4:
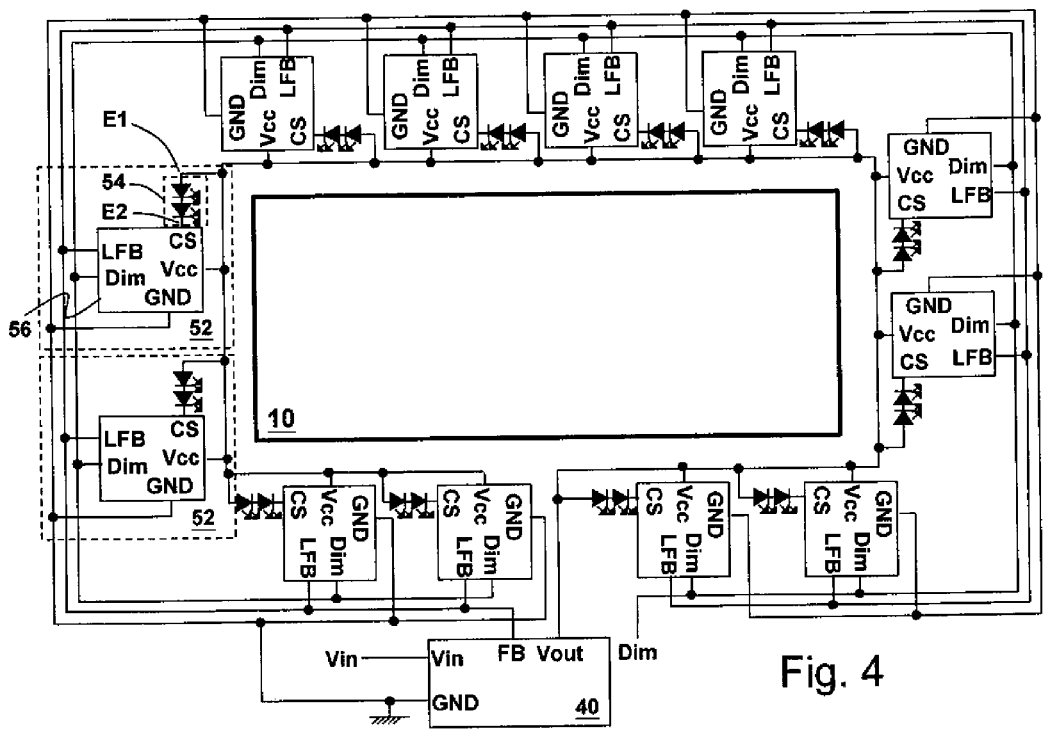
FIG. 4 shows a first embodiment of the present invention.

FIG. 4 shows a first embodiment of the present invention. As shown in the figure, an FPD includes a display module 10 for displaying an image; a power management circuit 40, which converts an input voltage Vin to an output voltage Vout according to a feedback signal FB; and multiple light emitting modules 52 for illuminating the display module 10. Each light emitting module 52 includes: at least one light emitting device string 54, each light emitting device string 54 having one or preferably more light emitting devices connected in series, and each light emitting device string 54 having a first end E1 and a second end E2, wherein the first end E1 is coupled to the output voltage Vout for receiving power; and a local circuit 56 having pins Vcc, CS, LFB, and GND. Pin Vcc receives power and provides an internal supply voltage to the local circuit 56 (the internal supply voltage is referred to as Vcc hereinafter). The internal supply voltage Vcc for example is generated by the output voltage Vout, or by other proper sources, such as the input voltage Vin or other DC voltages. Pin CS of the local circuit 56 is coupled to the second end E2, for controlling current through the light emitting device string 54. Each local circuit 56 generates a local feedback signal LFB at pin LFB, and the local feedback signal LFB is coupled to a feedback signal pin FB of the power management circuit 40 to provide the feedback signal FB. The feedback signal FB is determined by the lowest one of all the local feedback signals LFB (details will be described later). In this embodiment, if it is desired for the display module 10 to be capable of providing a dimming function, the local circuit 56 may further include a pin Dim. Each local circuit 56 receives the same dimming signal Dim, and adjusts current through each light emitting device string 54 according to the dimming signal Dim. The local circuit 56 does not need the pin Dim if the display module 10 does not need to provide the dimming function.

Figure 1:
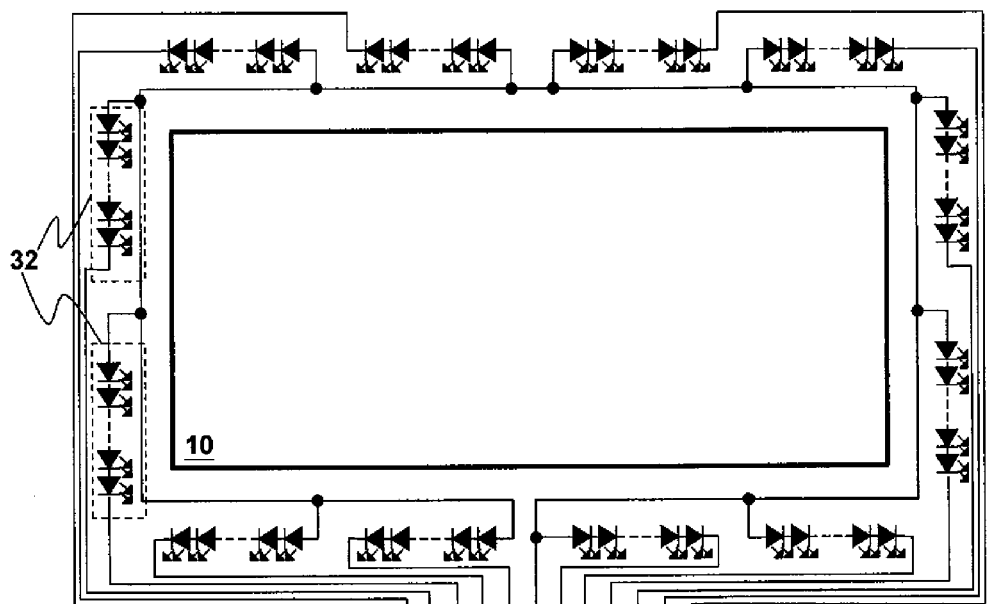
FIG. 1 shows a schematic diagram of a conventional FPD.
Figure 2:
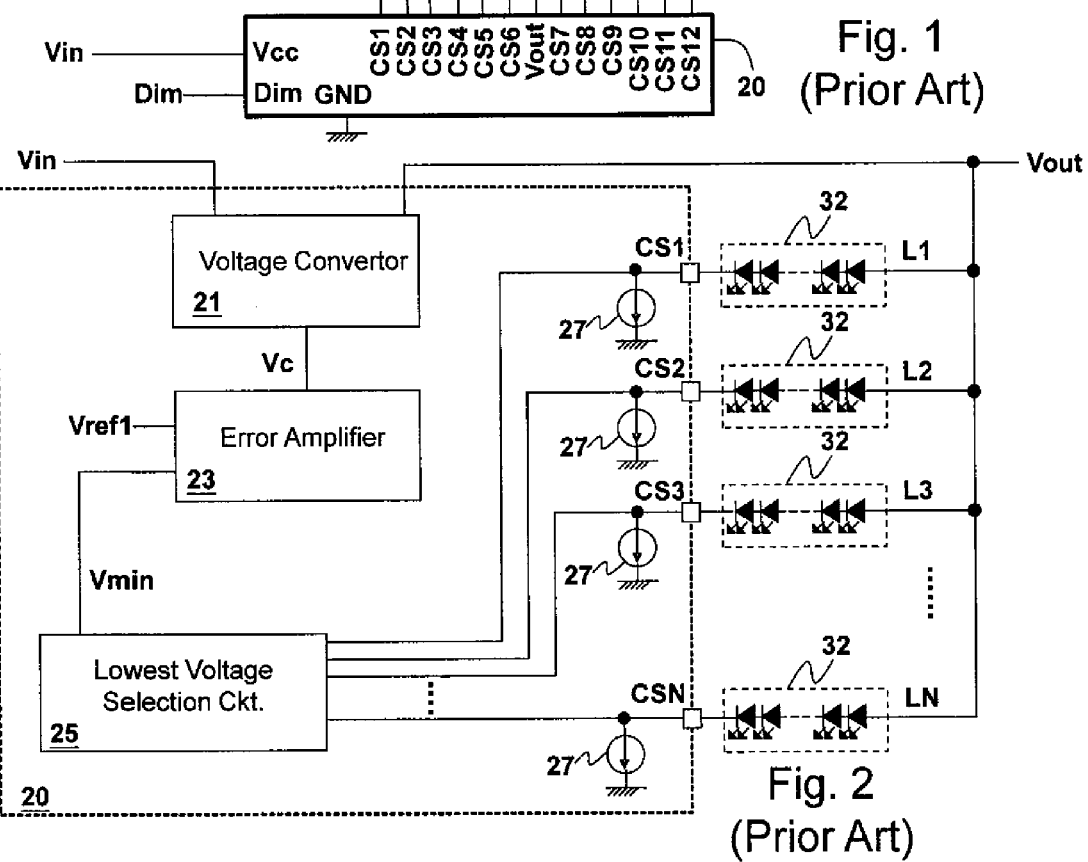
FIG. 2 shows a schematic diagram of the power management circuit 20 of a conventional FPD.
Figure 3:
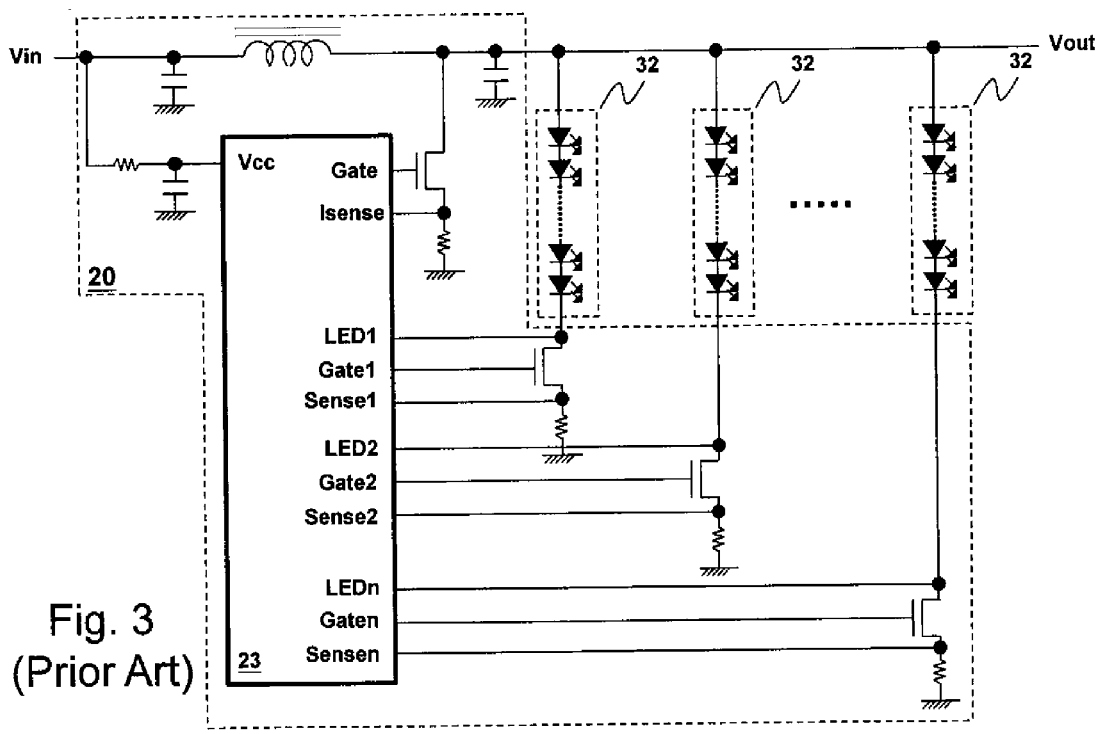
FIG. 3 shows a schematic diagram of the power management circuit 20 of another conventional FPD.

It can be found by comparing FIG. 4 with FIG. 1 that, in the present invention, because of the local circuit 56 which is provided locally and connected with the light emitting device string 54 to become one local module, i.e., the light emitting module 52, the wiring is simplified because the light emitting modules 52 may all share the same wires in the FPD. That is, the light emitting modules 52 may be commonly connected to the same wire for a specific function, instead of connected to different wires for different modules or light emitting device strings respectively). The number of the wires is greatly reduced to four, including: an output voltage common wire for delivering the output voltage Vout (if the internal supply voltage Vcc is generated by the output voltage Vout); a feedback signal common wire for delivering the feedback signal FB (LFB); a ground common wire for connection to ground level GND; and a dimming signal common wire for delivering the dimming signal Dim. In fact, if the display module 10 does not need to provide the dimming function, the dimming signal common wire can be omitted, and the number of the common wires is further reduced to three. In the prior art shown in FIG. 1, if there are N light emitting device strings 32, N+1 wires are needed. In contrast, the present invention obviously saves space effectively. Besides, in the prior art shown in FIG. 1, for different number of light emitting device strings 32, the internal circuit and the number of pins of the power management circuit 20 need to be modified or re-designed. In the present invention, the same power management circuit 40 can be used to cooperate with any number of light emitting device strings 32 without changing the internal circuit or the number of pins, as long as the total power required does not exceed the limit. Therefore obviously, the present invention is more advantageous than the prior art.

FIG. 5 shows the relationship between the power management circuit 40 and multiple light emitting modules 52. The feedback signals LFB of all the local circuits 56 are coupled to the same node, which is coupled to the feedback signal pin FB of the power management circuit 40. For better understanding, a feedback circuit 42 including resistors R1 and R2 is shown in the figure. This explains how the feedback signal FB includes information related to the output voltage Vout and information related to the lowest of the feedback signals LFB. The feedback signal FB is fed back to the power management circuit 40 for controlling the output voltage Vout. Note that even though FIG. 4 does not show the feedback circuit 42, FIGS. 4 and 5 are not conflicting with each other because the feedback circuit 42 may be considered as a part of the power management circuit 40, i.e., a circuit 40' shown in FIG. 5 may be considered as corresponding to the power management circuit 40 shown in FIG. 4. Besides, the feedback circuit 42 does not have to include the resistors R1 and R2; one or both of the resistors R1 and R2 may be omitted in a circuit design wherein the feedback signal FB is about equal to the minimum of the local feedback signals LFB.

The output voltage Vout is provided to all the light emitting modules 52. However, due to variation resulting from manufacture, the voltage across the light emitting device string 54 may be different from one another. A higher voltage drop across one light emitting device string 54 results in a relatively lower voltage at the pin CS of the corresponding local circuit 56. If the voltage at the pin CS is too low, the local circuit 56 cannot control current through the corresponding light emitting device string 54 as desired. Therefore, the output voltage Vout must be high enough to ensure all the voltages at pins CS of all the local circuits 56 are high enough. The voltage at pin CS of each local circuit 56 is related to the feedback signal LFB; in other words, to ensure that all the light emitting modules 52 operate normally, a proper feedback signal FB needs to be generated according to the lowest one of the feedback signals LFB, so that the output voltage Vout can be controlled accordingly.

FIG. 6A shows a more specific embodiment of the local circuit 56. In a preferred embodiment, the local circuit 56 may be integrated as an integrated circuit. As shown in FIG. 6A, a controllable current source CSL receives the dimming signal Dim, and adjusts the brightness of the light emitting device string 54 by controlling current through the light emitting device string 54 via pin CS (if the dimming function is not required, the controllable current source CSL may be a simple current source and it does not have to be controlled by the dimming signal Dim). If a voltage Vcs supplied to the controllable current source CSL is not high enough, the controllable current source CSL cannot operate normally. Therefore, the voltage Vcs must be maintained at a voltage at least higher than a minimum level which keeps the controllable current source CSL operating normally. One input terminal of a sink-only voltage follower 561 receives the voltage Vcs at node CS, the other input terminal, after biased by a DC bias Vos, is coupled to an output terminal. In other words, the output of the sink-only voltage follower 561 is maintained at the voltage Vcs+Vos. The DC bias Vos indicates an offset bias between the two input terminals of the sink-only voltage follower 561; it does not have to be a physical device. The purpose of this DC bias Vos is to provide flexibility to circuit design, so that it is easier to adjust the target of the feedback signal LFB, or to achieve other purposes in circuit design. This DC bias Vos does not have to exist, i.e., the DC bias Vos may be 0 or any other value. The voltage Vcs+Vos is outputted as the feedback signal LFB.

The voltage follower 561 is a sink-only type device for the reason below. Because the feedback signals LFB of all the local circuit 56 are coupled to the same node, when the voltage follower 561 is sink-only, the voltage at that node is determined by the lowest one among the feedback signals LFB; that is, the feedback signal FB is determined by the lowest one of the feedback signals LFB.

FIG. 6B shows another embodiment of the local circuit 56. This embodiment further provides an open-circuit detection function and a start-up error prevention function. As shown in the figure, except the same parts as FIG. 6A, the circuit further includes an open detection circuit. An embodiment of the open detection circuit for example is a comparator 563, which compares the voltage Vcs at node CS with a reference voltage Vref2. In normal condition, the voltage Vcs is higher than the reference voltage Vref2. If the light emitting device string 54 is open, the voltage Vcs is close or equal to 0, lower than the reference voltage Vref2. Therefore, the output of the comparator 563 indicates whether the light emitting device string 54 is open-circuited. However, when the circuit is starting up, the voltage Vcs is naturally lower than the reference voltage Vref2; in such a condition, the light emitting device string 54 is not open-circuited, but it may be determined as open-circuited. Therefore, in this embodiment, a start-up indication signal Vst (an indication signal generated when the circuit is starting up) is inputted to an input terminal of an OR logic gate 565, and the output of the comparator 563 is inputted to the other input terminal of the OR logic gate 565. An output of the OR logic gate 565 controls a switch Q1. When the light emitting device string 54 is open-circuited, and the circuit is not in start-up phase, the switch Q1 is OFF, i.e., the output of the voltage follower 561 in the local circuit 56 is not sent out so it does not affect the voltage at the common node connected by all the feedback signals LFB. Therefore, the power management circuit 40 will not incorrectly increase the output voltage Vout according to the output of the voltage follower 561 in this local circuit 56. On the other hand, when the circuit is in start-up phase, or when the light emitting device string 54 is not open-circuited, the output of the OR gate 565 turns ON the switch Q1, such that the output of the voltage follower 561 in this local circuit 56 is effectively provided to the common node of the feedback signal LFB. Note that under the teaching of the present invention, those skilled in this art can modify the above arrangement in various ways such as interchanging the positive and negative input terminals of the comparator 563, or using a different type of transistor for the switch Q1; and the logic gate 565 does not have to be an OR gate. The comparator 563 and the reference voltage Vref2 can be replaced by a level-detector circuit with a trip-point voltage equal to Vref2. The level-detector circuit can be as simple as a Smith-trigger or a logic gate with proper input trip-point voltage. All such modifications should belong to the scope of the present invention as long as they can achieve the functions of open-circuit detection and start-up error prevention.

Figure 6C:
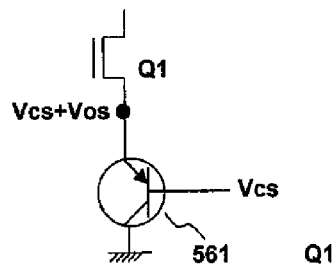
FIG. 6C shows a more specific embodiment of a sink-only voltage follower 561.

One simplest form to embody the sink-only voltage follower 561 is shown in FIG. 6C, which is a PNP bipolar junction transistor (BJT). The sink-only voltage follower 561 may be embodied in other more complicated forms, which are readily conceivable by those skilled in this art under the teaching of the present invention, and therefore is not redundantly explained here.

Figure 6D:
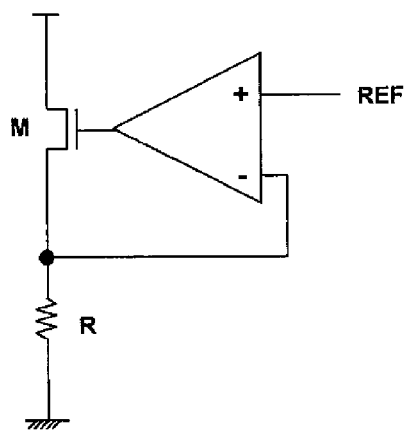
FIGS. 6D and 6E show a more specific embodiment of a current source CSL.
Figure 6E:
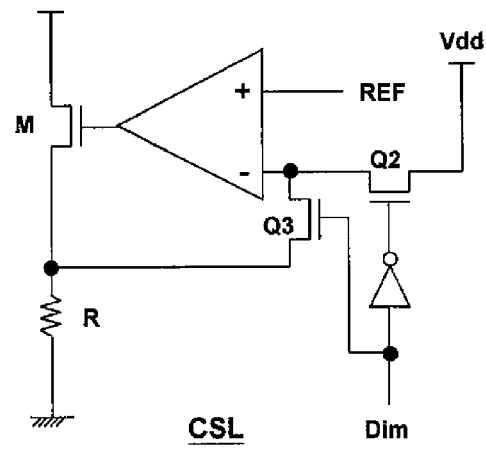

If the controllable current source CSL is a simple current source, it can be a circuit as shown in FIG. 6D. When the circuit is stable, the current through the transistor M is equal to REF/R, wherein the transistor M may be replaced by a BJT. If it is required to provide a dimming function, the controllable current source CSL may be as shown in FIG. 6E, wherein the dimming signal Dim is a pulse width modulation (PWM) signal. When the dimming signal Dim is at high level, the switch Q2 turns OFF, and the switch Q3 turns ON; the controllable current source CSL functions as a simple current source in FIG. 6D. When the dimming signal Dim is at low level, the switch Q2 turns ON, and the switch Q3 turns OFF; the voltage at the negative input terminal of the amplifier is higher than the voltage at its positive input terminal, so the transistor M turns OFF. Thus, the average current through the transistor M is controlled by a duty ratio of the dimming signal Dim. That is, the average current through the light emitting device string 54 may be controlled by the duty ratio of the dimming signal Dim. Such PWM dimming method is a major trend in FPDs and therefore the present invention focuses on explaining how it works, but certainly, the present invention is applicable to FPDs using other dimming methods.

Figure 7:
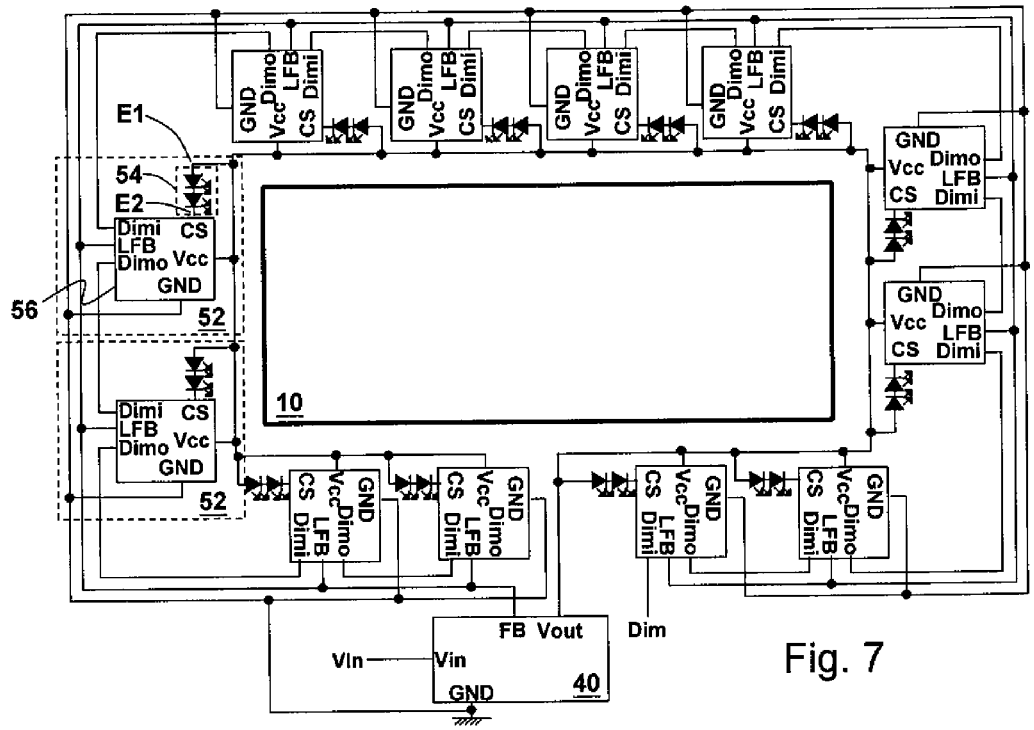
FIG. 7 shows another embodiment of the present invention.

FIG. 7 shows another embodiment of the present invention. This embodiment is different from the first embodiment in that, the dimming signal Dim is not coupled to all the local circuits 56 at a common node; instead, it is coupled to a dimming signal input pin Dimi of one of the local circuits 56. The local circuit 56 which receives the dimming signal Dim phase-shifts the dimming signal Dim and then outputs the phase-shifted dimming signal from a dimming signal output pin Dimo to a dimming signal input pin Dimi of another local circuit 56, and so on. "Phase-shift" means that the dimming signal Dim is delayed for a period of time while keeping the same pulse width. In this way, the light emitting device strings 54 will not turn ON and OFF all at the same time. On the one hand, this avoids drastic brightness fluctuation in the FPD (even though such fluctuation may not be perceivable by human eyes, it still may impact the quality of images to some extent); on the other hand, because it is not required to provide the dimming signal Dim to all the local circuits 56, the dimming signal Dim is less likely distorted, nor is it required to pull up the voltage level of the dimming signal Dim.

Figure 8:
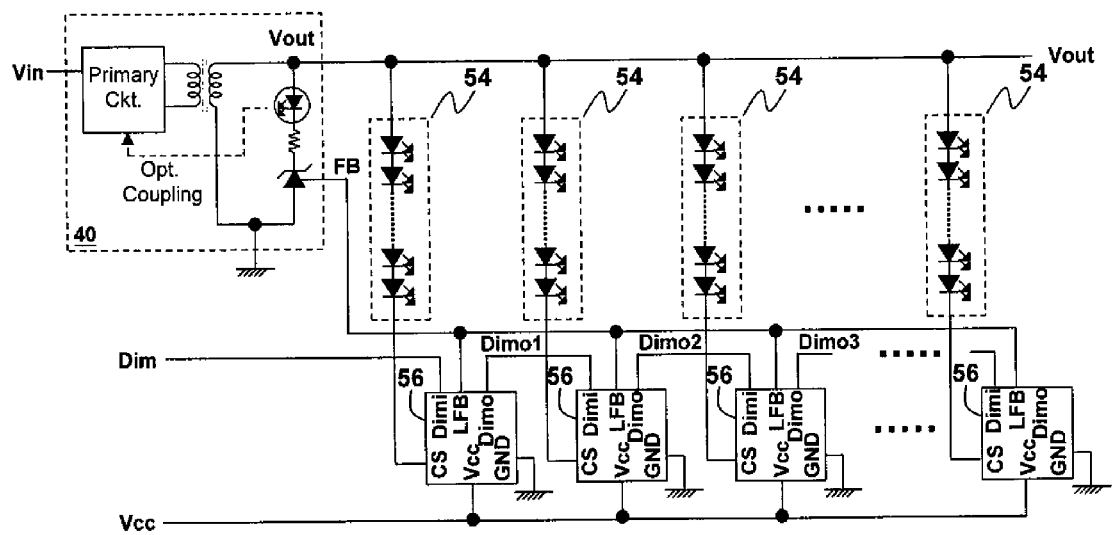
FIG. 8 shows a schematic diagram of a power management circuit 40 and multiple light emitting modules 52 of the embodiment shown in FIG. 7.

FIG. 8 shows a schematic diagram of the power management circuit 40 and multiple light emitting modules 52. FIG. 8 shows the cascaded connection for the dimming signal as mentioned above, wherein the dimming signal Dim (or Dimo1, Dimo2, . . . ) is received by the dimming signal input terminal Dimi of one local circuit 56, phase-shifted by this local circuit 56, and then outputted from the output terminal Dimo of this local circuit 56 to the input terminal Dimi of another local circuit 56. In FIG. 8, the power management circuit 40 is shown as an AC-DC converter for example; certainly, the power management circuit 40 is not limited to the AC-DC converter, but also can be a DC-DC converter such as the ones shown in FIGS. 23A-23H.

FIG. 9 illustrates one possible arrangement of the phase-shift dimming. Referring to both FIGS. 8 and 9, a first local circuit 56 receives the dimming signal Dim at its dimming signal input terminal Dimi, and generates a dimming signal Dimo1, which is outputted from its dimming signal output terminal Dimo to the dimming signal input terminal Dimi of a second local circuit 56. The second local circuit 56 generates a dimming signal Dimo2 according to the dimming signal Dimo1, and sends the dimming signal Dimo2 to the dimming signal input terminal Dimi of a third local circuit 56, and so on. In the embodiment of FIG. 9, the falling edge of a previous dimming signal triggers the rising edge of a next stage dimming signal Dim; the detailed embodiment of the circuit will be described later. Note that phase-shifting can be done in various ways other than triggering the rising edge of a next stage dimming signal by the falling edge of a previous dimming signal.

A local circuit 56 capable of phase-shifting a dimming signal may be as shown in FIG. 10, wherein the local circuit 56 further includes a phase-shift dimming circuit 567. The phase-shift dimming circuit 567 for example includes a delay locked loop (DLL) 5671 as shown in FIG. 11, or a pulse width (PW) mirror 5673 as shown in FIG. 12. In FIG. 10, it is the phase-shifted dimming signal Dimo which controls the controllable current source CSL; however, the controllable current source CSL can certainly be controlled by the pre-phase-shifted dimming signal Dimi instead.

Figure 13A:
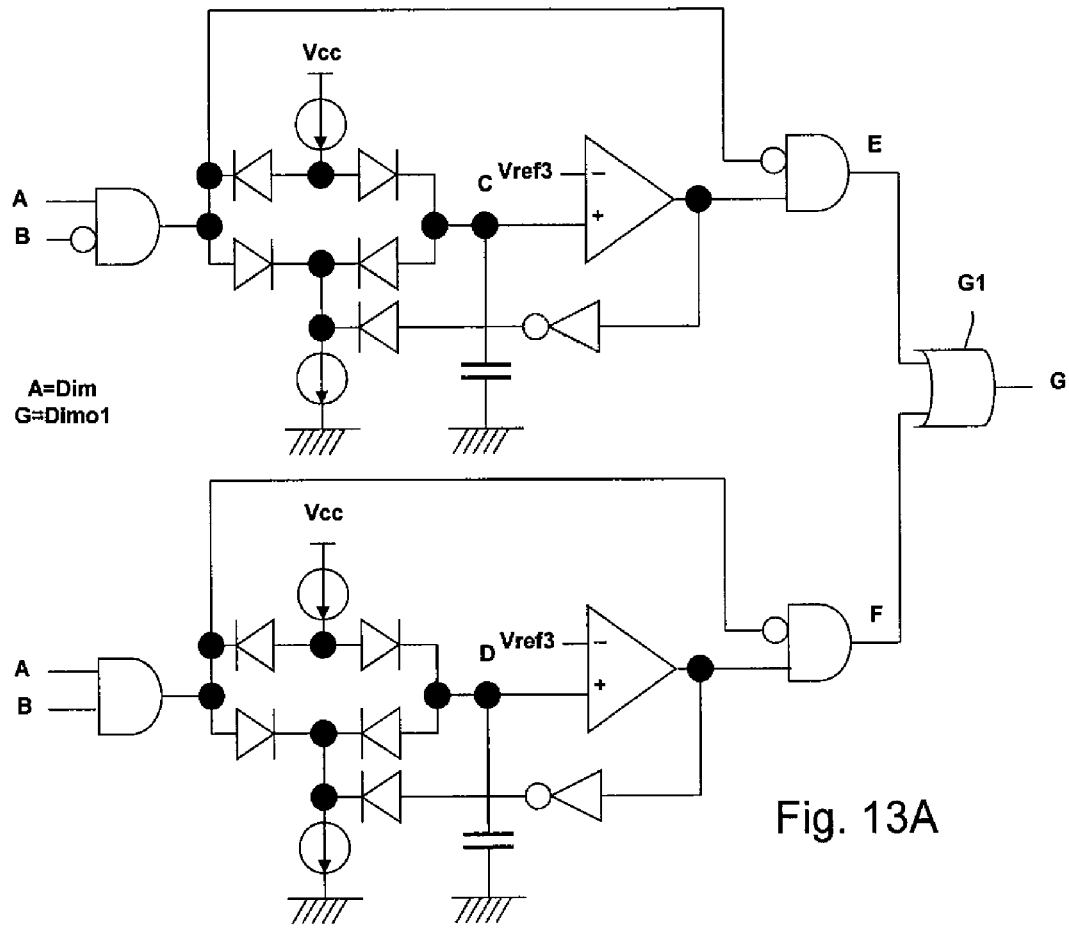
FIG. 13A shows a more specific embodiment of the PW mirror 5673 shown in FIG. 12.
Figure 13B:
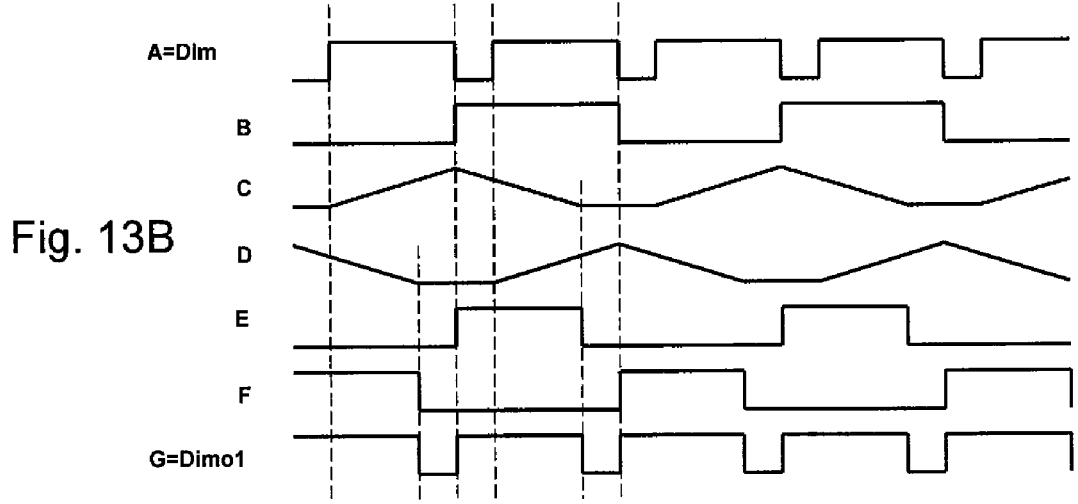
FIG. 13B shows waveforms of signals at different nodes shown in FIG. 13A.

FIG. 13A shows a more specific embodiment of the PW mirror 5673 shown in FIG. 12, and FIG. 13B shows signal waveforms at several nodes shown in FIG. 13A. Referring to FIGS. 13A and 13B, how the PW mirror 5673 duplicates and delays the dimming signal Dim is described below. As shown in the figures, signal A is the dimming signal Dim, and signal G is the phase-shifted dimming signal Dimo1 (with a shifted phase to the dimming signal Dim). Signal B is obtained from the falling edge of signal A (signal B is at high level at a first falling edge of signal A, and changes to low level at a second falling edge of signal A, and so on; i.e., signal B is a standard frequency division signal triggered by the falling edges of signal A). In FIG. 13A, the function of the upper circuit is to generate signal E according to signal A, and the function of the lower circuit is to generate signal F according to signal A. As shown in FIG. 13B, signal E is obtained by delaying and duplicating odd (a first, a third, a fifth, . . . ) duty cycles of signal A, and signal F is obtained by delaying and duplicating even (a second, a fourth, a sixth, . . . ) duty cycles of signal A (the rising edges of signals E and F follow the falling edges of signal A). Thus, by combining signals E and F via an OR gate G1, signal G can be obtained.

Figure 14:
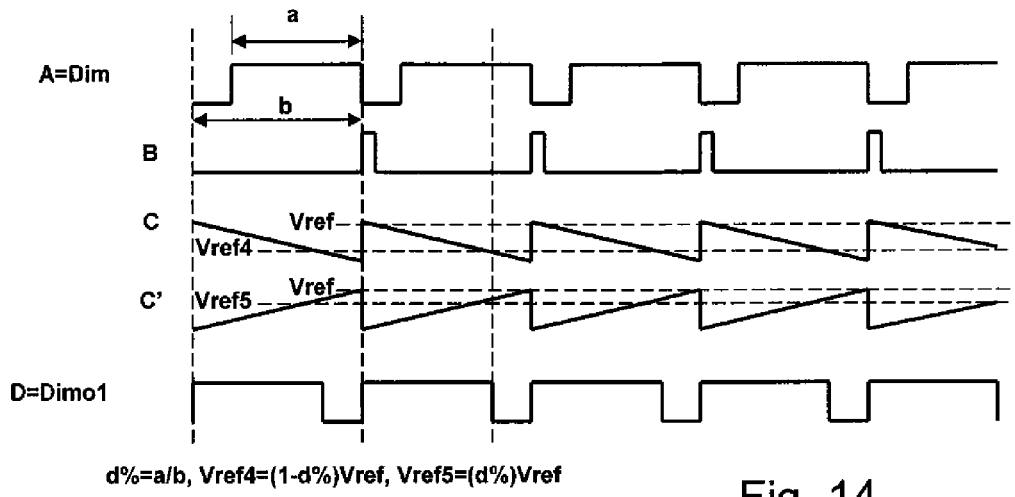
FIG. 14 shows an example of the waveforms of dimming signals Dim and Dimo.
Figure 15:
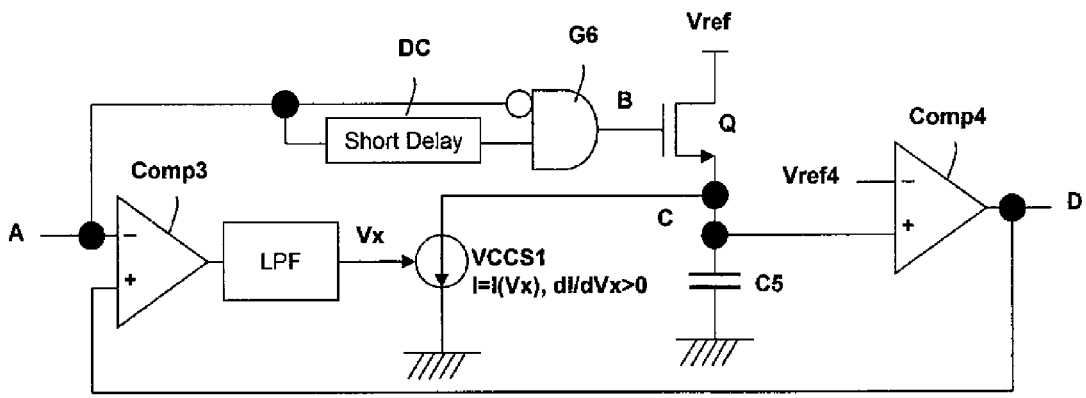
FIG. 15 shows an embodiment of the phase-shift circuit 567.
Figure 16:
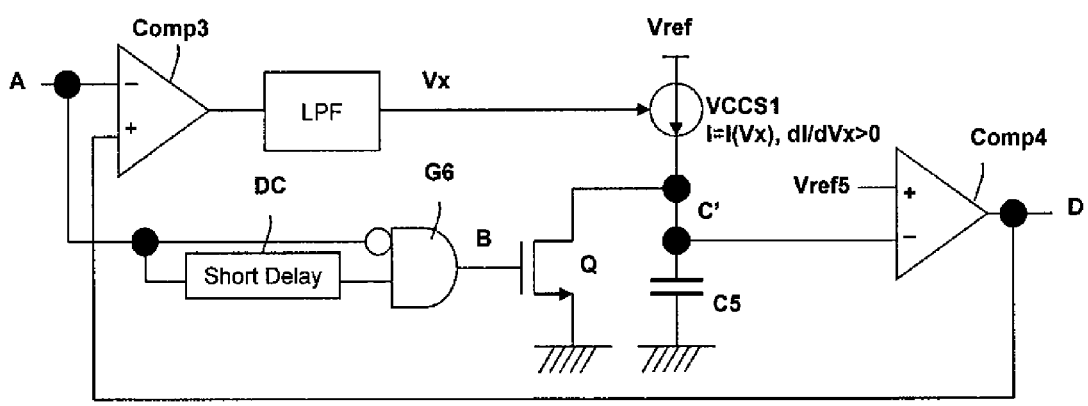
FIG. 16 shows another embodiment of the phase-shift circuit 567.

FIG. 14 shows signal waveforms representing another relationship between the dimming signals Dim and Dimo, which indicates that the dimming signal Dimo may be generated by different embodiments. FIGS. 15 and 16 show two embodiments which generate the waveforms shown in FIG. 14. Those skilled in this art can readily conceive other specific embodiments of the phase-shift dimming circuit 567 from the spirit of the embodiments shown in FIGS. 15 and 16. The scope of the present invention is not limited within these two embodiments.

In the embodiments shown in FIGS. 15 and 16, slopes of signal C and C' are determined by the voltage-controlled current source VCCS1, and the term "voltage-controlled current source" means that the current through the current source can be controlled by a voltage. In FIG. 15, signal A is delayed by a short delay circuit DC for a short period. The signal generated by the short delay circuit DC and an inverted signal of signal A are inputted to an AND gate G6; the AND gate G6 generates a short pulse signal related to the falling edge of signal A, which is signal B shown in FIG. 14. Signal B controls a transistor switch Q. When signal B is at high level, the transistor switch Q turns ON, and node C is pulled to Vref, such that the output signal (signal D) of a comparator Comp4 changes to high level. When signal B is at low level, the transistor switch Q turns OFF, and the capacitor C5 discharges via the current source VCCS1; when the voltage at node C is decreased to Vref4, the output signal (signal D) of the comparator Comp4 changes to low level. The discharge rate of the capacitor C5 (i.e., the decrease rate of signal C) is determined by the current source VCCS1. Signal A and the feedback signal D are compared by the comparator Comp3, and then the comparison result is processed by the low-pass filter LPF to obtain an average, i.e., the voltage signal Vx, which is used to control the current source VCCS1. As such, the current of the current source VCCS1 is feedback adjusted to a proper value. When the pulse width of signal D is relatively wide, the discharge rate of the capacitor C5 is controlled to increase, and when the pulse width of signal D is relatively narrow, the discharge rate of the capacitor C5 is controlled to decrease, such that the pulse width of signal D will finally balance at the same pulse width of signal A.

Similarly, FIG. 16 shows that when signal B is at high level, the transistor switch Q turns ON, and node C' is coupled to ground, such that the output of the comparator Comp 4 (signal D) changes to high level. When signal B is at low level, the transistor switch Q turns OFF, and the capacitor C5 is charged by the current source VCCS1; when signal C' is higher than a reference voltage Vref5, signal D changes from high level to low level. In this circuit, signal D is also fed back to the comparator Comp 3, and the output of the comparator Comp 3 passes through the low-pass filter LPF to generate the voltage signal Vx, for controlling VCCS1. Thus, the slope of signal C' is properly determined.

Figure 17:
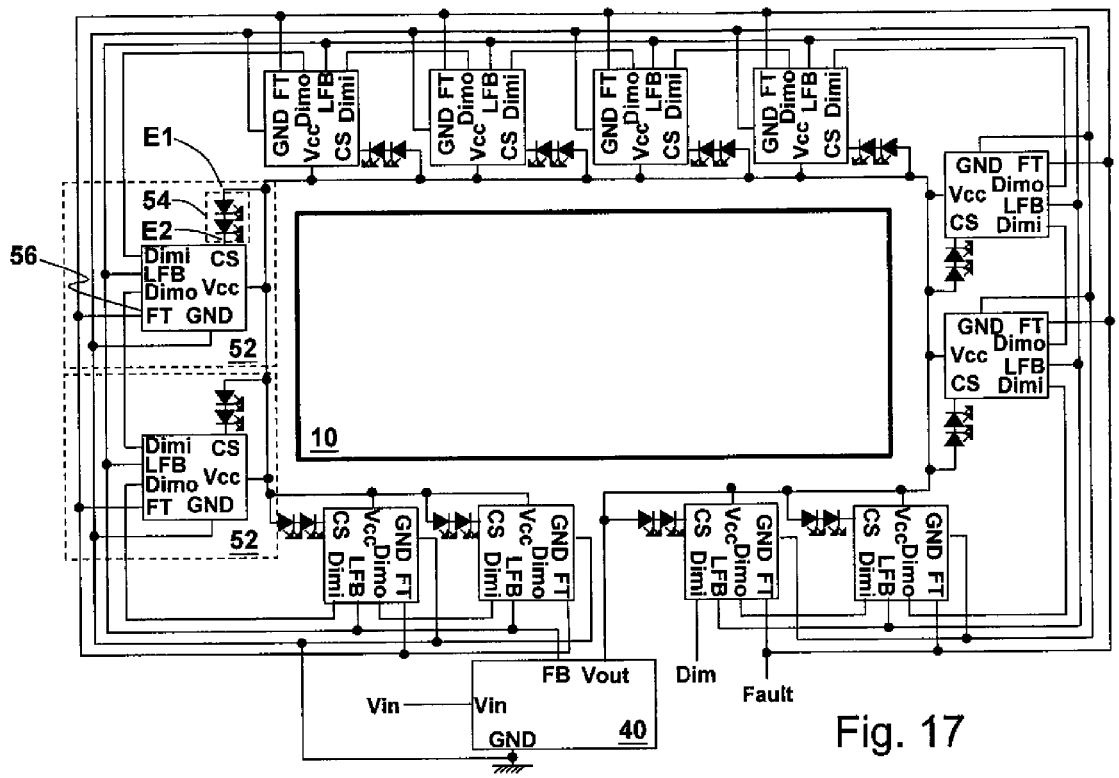
FIG. 17 shows another embodiment of the present invention.

FIG. 17 shows another embodiment of the present invention. Referring to FIG. 17 and also FIG. 18A, this embodiment is different from the embodiment shown in FIGS. 7 and 10 in that, in this embodiment, the local circuit 56 detects whether the light emitting device string 54 is short-circuited besides detecting open-circuit. A short circuit condition means that one or more light emitting devices in the light emitting device string 54 are short-circuited. When a short-circuit condition is detected, a local fault signal FT is generated to indicate an abnormal condition. In this embodiment, the local fault signals FT of all the local circuit 56 are coupled to a same node, and outputted as a fault signal Fault; that is, when any one of the local circuits 56 generates the local fault signal FT, an abnormal condition is indicated by the fault signal Fault.

Figure 18A:
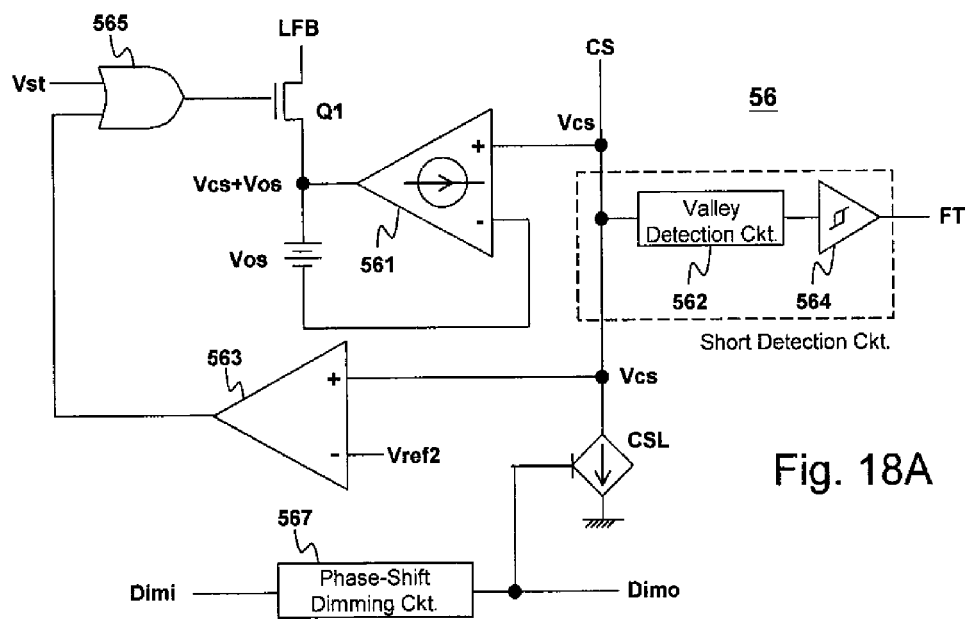
FIGS. 18A and 18B show a more specific embodiment of the local circuit 56.

A basic method to detect whether the light emitting device string 54 is short-circuited is to check if the voltage Vcs at node CS shifts toward the output voltage Vout abnormally (when the output voltage Vout is positive, it is checked whether the voltage Vcs is too high; when the output voltage out is negative, it is checked whether the voltage Vcs is too low). Referring to FIG. 18A, the local circuit 56 includes the short detection circuit. In this embodiment, as an example, the short detection circuit includes a valley detection circuit 562 and a Smith trigger 564. For easier understanding, let us first assume that the voltage Vcs is a static DC voltage (static operation); in this condition, the output voltage of the valley detection circuit 562 is equal to voltage Vcs (in fact, the valley detection circuit 562 is not required if the voltage Vcs is a static DC voltage). When the voltage Vcs at node CS exceeds a transition point (also referred as the trip-point) voltage of the Smith trigger 564, the Smith trigger 564 generates the fault signal FT. The Smith trigger 564 may be replaced by a comparator, comparing the voltage Vcs at node CS with a predetermined reference voltage. When the voltage Vcs at node CS is higher than the reference voltage, the comparator generates the fault signal FT. In a dynamic operation condition where the voltage Vcs is fluctuating, not a static DC voltage, the valley detection circuit 562 is required. A typical case of the dynamic operation is PWM dimming. The voltage Vcs is fluctuating in PWM dimming as thus. When the dimming signal Dimo is at low level, the controllable current source CSL does not operate, and the current through the light emitting string 54 is zero or close to zero; the voltage drop across the light emitting device string 54 is low, so the voltage Vcs at node CS is closer to the output voltage Vout. On the other hand, when the dimming signal Dimo is at high level, the controllable current source CSL operates normally; the voltage drop across the light emitting device string 54 is relatively high, so the voltage Vcs at node CS drops to a low level. In such condition where the circuit provides the PWM dimming function, the function of the valley detection circuit 562 is thus. If a short-circuit condition happens in the light emitting device string 54 when the dimming signal Dimo is at high level, the voltage drop of the light emitting device string 54 is relatively lower than that in a normal condition, i.e., the voltage Vcs at node CS is relatively closer to the output voltage Vout. In other words, when the dimming signal Dimo switches between the low level and the high level, for a light emitting device string 54 operating normally, the valley of the voltage Vcs at node CS is a normal low voltage; however, for a light emitting device string 54 wherein the short-circuit condition occurs, the valley of the voltage Vcs at node CS abnormally shifts toward the output voltage Vout. Therefore, to determine whether the voltage Vcs is close to the output voltage because of short-circuit, the valley detection circuit 562 is required for detecting the valley of the voltage Vcs. As seen from the above, if the circuit does not provide the PWM dimming function (static operation), the valley detection circuit 562 is not required; in this case, the voltage Vcs may be directly inputted to the Smith trigger 564, or the voltage Vcs may be compared with a predetermined reference voltage directly.

Figure 18B:
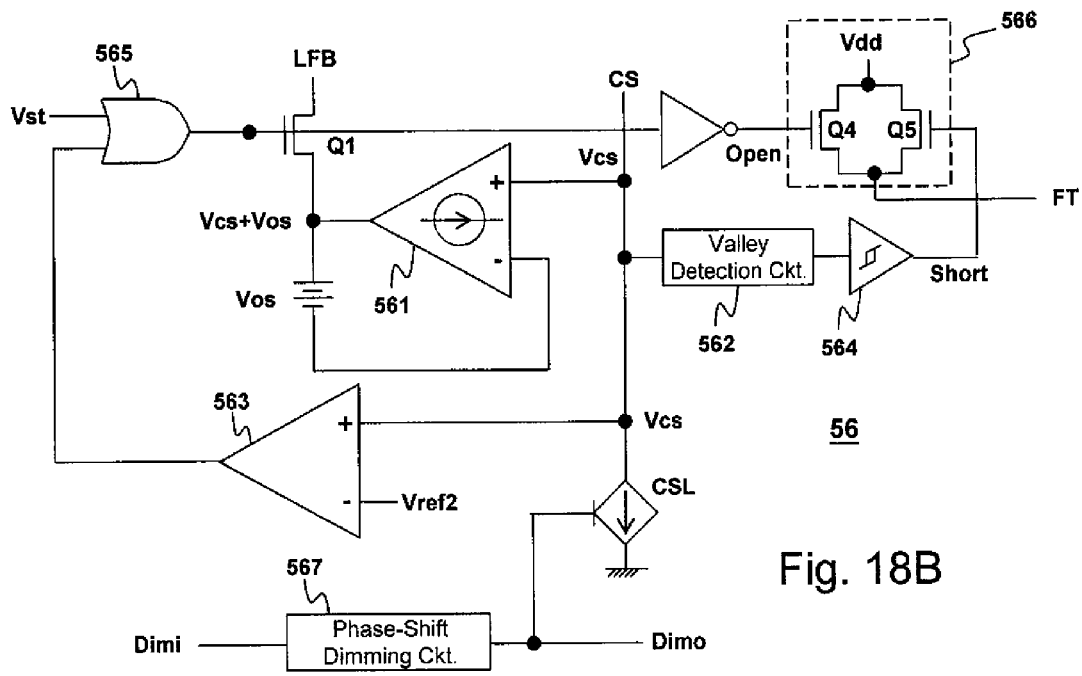

FIG. 18B shows another embodiment of the local circuit 56. In this embodiment, the local fault signal FT is generated when either the short-circuit condition or the open-circuit condition happens. In the figure, the circuit 566 has a function similar to a logic OR gate. When the voltage Vcs is lower than the reference voltage Vref2, and the start-up indication signal Vst is at low level (indicating that the open-circuit condition happens in the light emitting device string 54 while the circuit is not in start-up phase), the output of the logic OR gate 565 is at low level, so the switch Q4 turns ON, and the local fault signal FT is outputted from the circuit 566. On the other hand, if the output of the Smith trigger 564 is at high level, (indicating that the short-circuit condition happens in the light emitting device string 54), the switch Q5 turns ON, and the circuit 566 also outputs the local fault signal FT with high level.

Figure 18C:
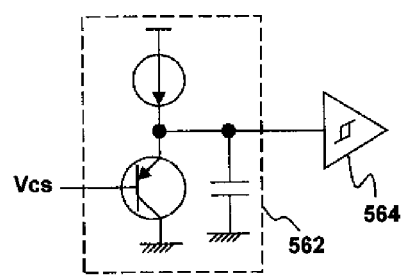
FIG. 18C shows a more specific embodiment of a valley detection circuit 562.

The valley detection circuit 562 shown in FIGS. 18A and 18B can be embodied in various ways. FIG. 18C shows an embodiment of the valley detection circuit 562. In this embodiment, there is a fixed voltage difference between the output of the valley detection circuit 562 and the lowest voltage (valley) of the voltage Vcs, but this is alright because such difference can be compensated by setting a proper transition point of the Smith trigger 564; the primary function of the circuitry is not impacted.

Furthermore, for the embodiments illustrated in FIGS. 17 and 18A-18C, because the FT output of all the light emitting modules 52 are coupled to the same Fault node (or wire), the wired-OR skill should be used for this connection. This can be achieved by connecting source-only FT outputs together with a common pull-low device coupling to the Fault node (or wire). Or, it can also be achieved by connecting sink-only FT outputs together with a common pull-high device coupling to the Fault node (or wire) with an inversed logic.

Figure 19:
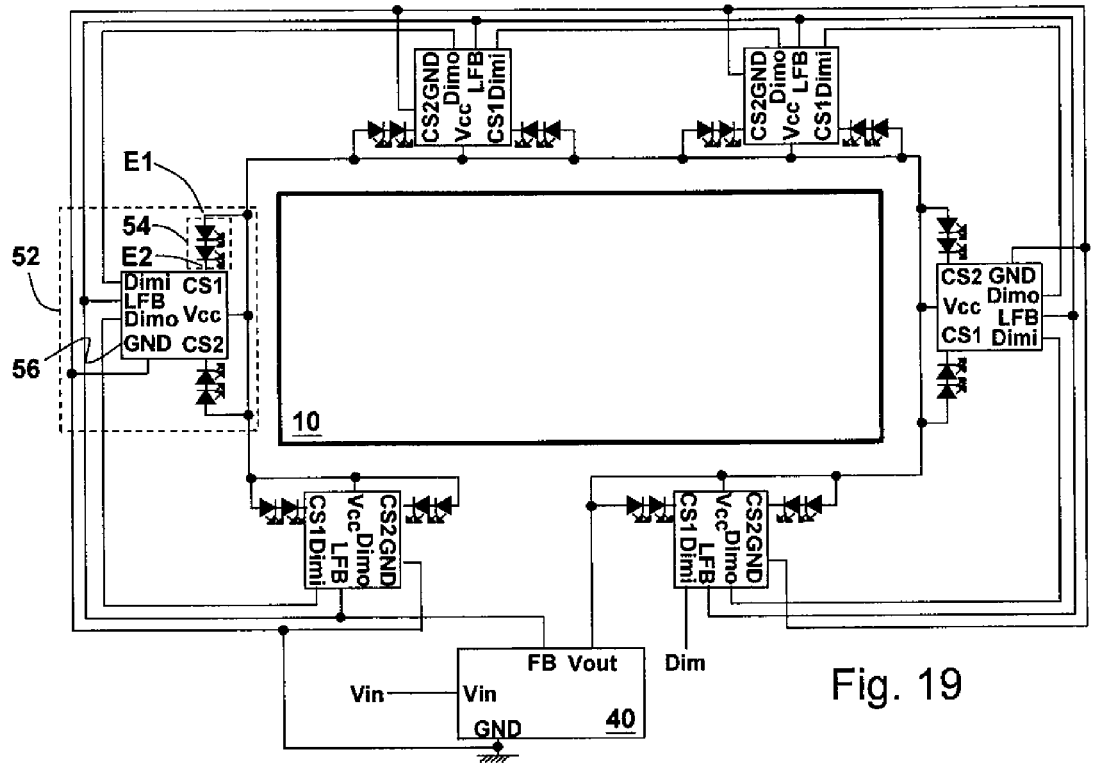
FIG. 19 shows another embodiment of the present invention.

FIG. 19 shows another embodiment of the present invention. This embodiment is different from the embodiment shown in FIG. 7 in that, the local circuit 56 of this embodiment may be coupled to multiple light emitting device strings 54, for example but not limited to two light emitting device strings 54 as shown in FIG. 19, wherein the nodes CS1 and CS2 of the local circuit 56 are coupled to the second ends E2 of two different light emitting device strings 54 respectively.

Figure 20:
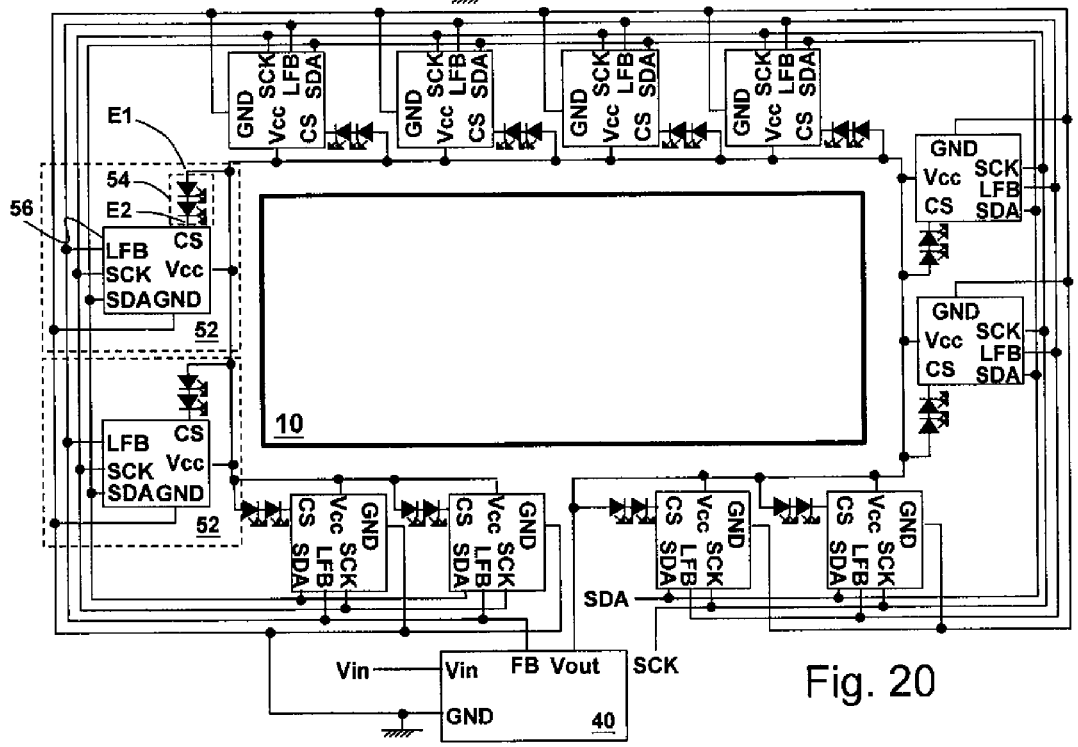
FIG. 20 shows another embodiment of the present invention.

FIG. 20 shows another embodiment of the present invention. This embodiment is different from the embodiment shown in FIG. 7 in that, the local circuit 56 of this embodiment further receives serial data for setting at least an internal parameter of the local circuits 56. For example, a parameter of the current source in each local circuit 56 may be set individually such that currents through different light emitting device strings 54 can be set respectively. The serial data is delivered by, for example but not limited to, an inter-integrated circuit (I2C) data bus as shown in the figure. As shown in the figure, the local circuits 56 receive serial data SDA and a clock signal SCK, and different local circuits 56 can respectively adjust their internal parameters, such as current through the light emitting device string 54, or various reference voltages, etc., according to the serial data SDA and the clock signal SCK.

Figure 21:
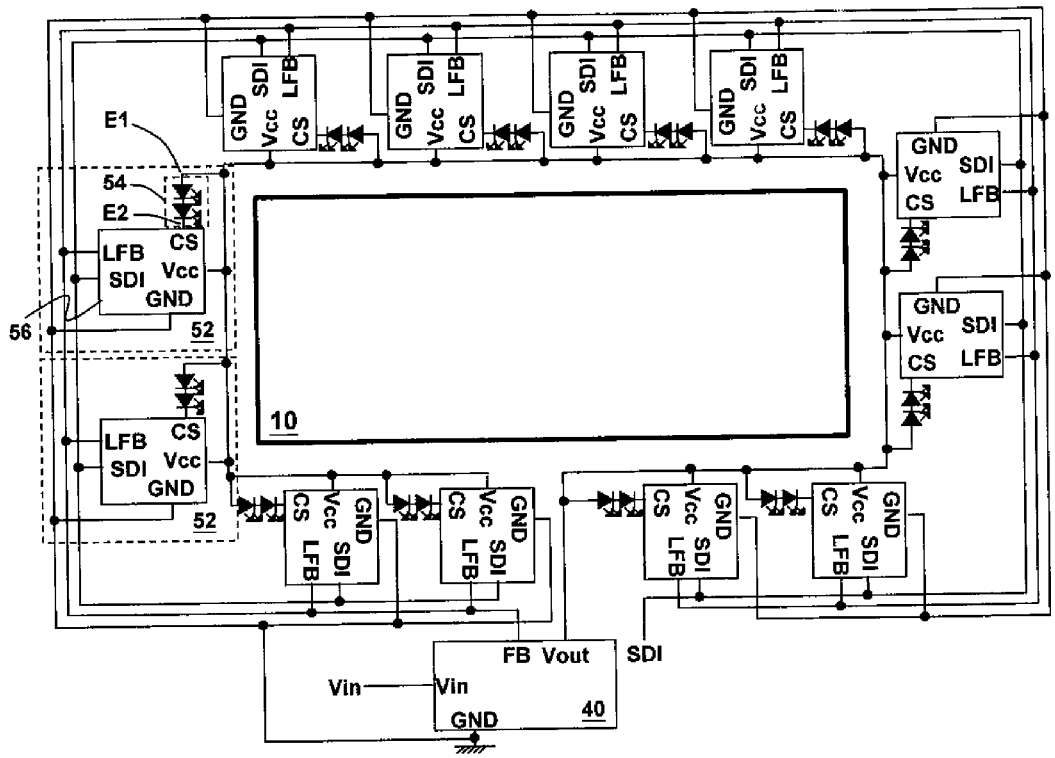
FIG. 21 shows another embodiment of the present invention.

FIG. 21 shows another embodiment of the present invention. This embodiment is similar to the embodiment shown in FIG. 20 in that, the local circuit 56 of this embodiment receives serial data to adjust current through the light emitting device strings 54 (or other internal parameters). This embodiment is different from the embodiment shown in FIG. 20 in that, the serial data is delivered by, for example but not limited to, a one-wire data bus, wherein the one-wire data bus may include: an asynchronous data bus, a secure socket layer (SSL) data bus, or a tri-state data bus. As shown in the figure, the local circuit 56 receives serial data SDI, and different local circuits 56 can respectively adjust their internal parameters, such as current through the light emitting device string 54, or various reference voltages, etc., according to the serial data SDI.

Figures 22A, 22B:
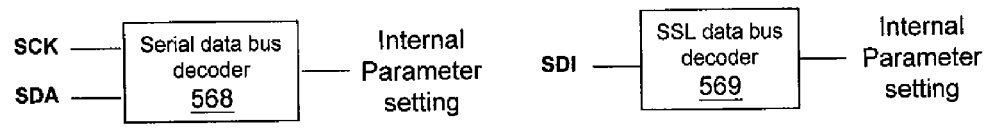
FIGS. 22A and 22B show that the local circuit 56 may include a serial data bus decoder 568 or a one-wire data bus decoder 569 internally.
Figure 23A:
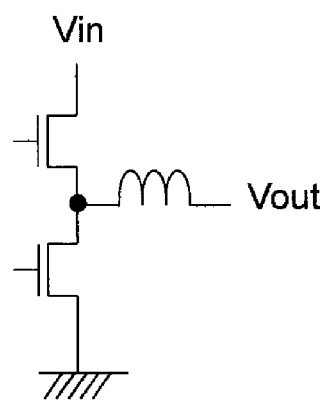
FIGS. 23A-23H show synchronous and asynchronous buck, boost, inverting and buck-boost converters.
Figure 23B:
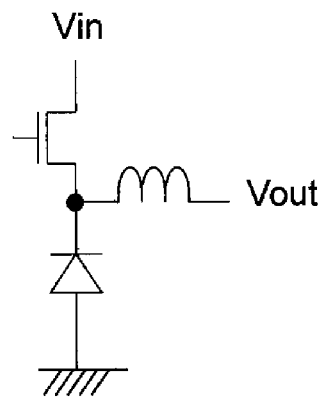
Figure 23C:
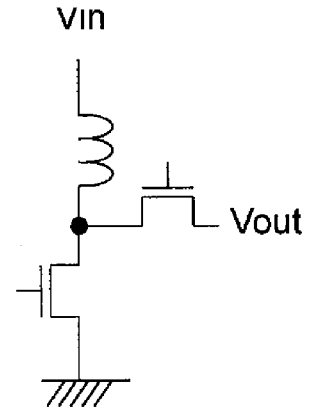
Figure 23D:
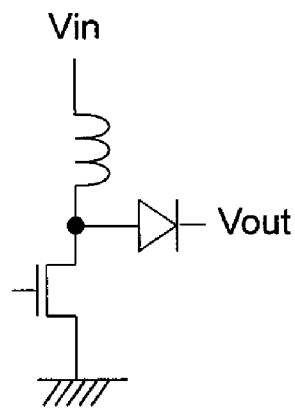
Figure 23E:
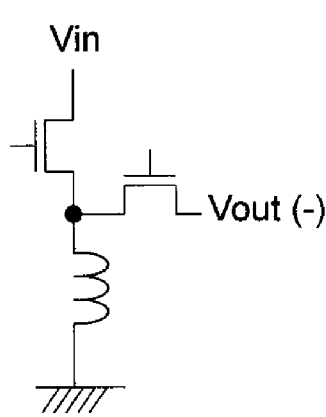
Figure 23F:
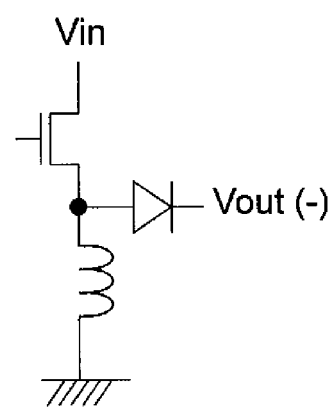
Figure 23G:
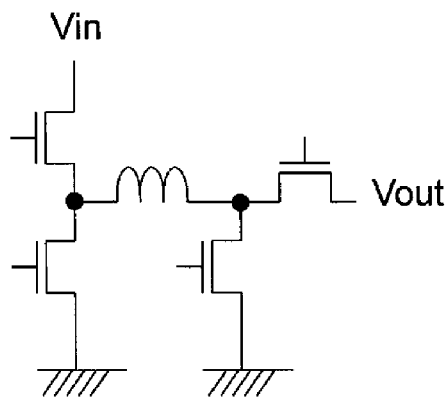
Figure 23H:
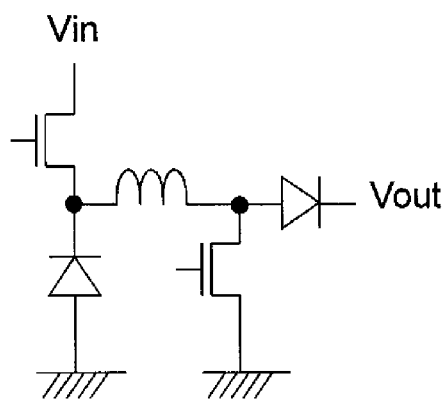

As shown in FIG. 22A, a serial data bus decoder 568 may be provided in the local circuit 56 in correspondence to the embodiment shown in FIG. 20. The serial data bus decoder 568 decodes the serial data SDA and sets the internal parameter according to the serial data SDA and the clock signal SCK. As shown in FIG. 22B, a one-wire serial data bus decoder 569 may be provided in the local circuit 56 in correspondence to the embodiment shown in FIG. 21. The one-wire serial data bus decoder 569 decodes the serial data SDI and sets the internal parameter according to the serial data SDI.

In the aforementioned embodiments, if the power management circuit 40 is a DC-DC convertor, it may be, but is not limited to, a synchronous or asynchronous buck, boost, or inverting conversion circuit as shown in FIGS. 23A-23H, wherein if the output voltage Vout is a negative voltage, the light emitting devices need to be reversely connected, and the circuit needs to be modified correspondingly. For example, meanings of the high level and the low level of the output of the comparator 563 and the Smith trigger 564 may need to be interchanged. The valley detection circuit 562 may need to be changed to a peak detection circuit, and the internal supply voltage Vcc and ground GND may need to be coupled to other sources, etc.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device which does not substantially influence the primary function of a signal can be inserted between any two devices in the shown embodiments. For another example, the local circuits 56 in the FPD may each be coupled to a different number of light emitting device strings 54 instead of all coupled to the same number of light emitting device string(s) 54. For another example, the light emitting device is not limited to a light emitting diode as shown in the aforementioned embodiments, but it may be any DC-controlled light emitting device. For another example, meanings of the high and low levels of the digital signals are interchangeable, with corresponding amendment of the circuits processing these signals. In view of the foregoing, the spirit of the present invention should cover all such and other modifications and variations, which should be interpreted to fall within the scope of the following claims and their equivalents.

What is claimed is:
1. A flat panel display (FPD), comprising:
a display module for displaying an image;
a power management circuit, which converts an input voltage to an output voltage according to a feedback signal;
a plurality of light emitting modules for illuminating the display module, each light emitting module including:
at least one light emitting device string, each light emitting device string having one or more light emitting devices connected in series, and each light emitting device string having a first end and a second end, wherein the first end is coupled to the output voltage for receiving power; and a local circuit for controlling current through the light emitting device string and generating a local feedback signal, wherein the local circuit has a first terminal for receiving power, a second terminal for coupling to the second end of the light emitting device string to control the current through the light emitting device string, a third terminal for generating the local feedback signal, and a fourth terminal for coupling to ground;

wherein the local feedback signal of each light emitting module is coupled to a first node for providing the feedback signal at the first node; and a common wiring cluster including: an output voltage common wire for delivering the output voltage; a feedback signal common wire for delivering the feedback signal; and a ground common wire; wherein each light emitting module is electrically coupled to each of the common wires.

2. The FPD of claim 1, wherein the local circuit further includes a fifth terminal for receiving a dimming signal to adjust current through the light emitting device string.

3. The FPD of claim 2, wherein each local circuit of the multiple light emitting modules receives the same dimming signal to commonly adjust current through each light emitting device string, and the common wiring cluster further includes a dimming common wire for delivering the dimming signal.

4. The FPD of claim 2, wherein the local circuit further includes a sixth terminal for outputting a phase-shifted dimming signal generated by phase-shifting the dimming signal received from the fifth terminal.

5. The FPD of claim 1, wherein the local circuit further includes a fifth terminal for outputting a local fault signal to indicate a fault condition, wherein the local fault signal of each light emitting module is coupled to a second node.

6. The FPD of claim 1, wherein the local circuit further receives serial data for adjusting an internal parameter of the local circuit.

7. The FPD of claim 6, wherein the serial data is delivered by an inter-integrated circuit (I2C) data bus or a one-wire data bus.

8. The FPD of claim 7, wherein the one-wire data bus includes: an asynchronous data bus, a secure sockets layer (SSL) data bus, or a tri-state data bus.

9. The FPD of claim 1, wherein the local circuit includes: a current source for controlling the current through the light emitting device string via the second terminal; and a sink-only voltage follower for generating the local feedback signal according to a voltage at the second terminal.

10. A light emitting module for use in a flat panel display (FPD), the light emitting module comprising:
at least one light emitting device string, each light emitting device string having one or more light emitting devices connected in series, and each light emitting device string having a first end and a second end, wherein the first end is coupled to the output voltage for receiving power; and
a local circuit for controlling current through the light emitting device string and generating a local feedback signal, wherein the local circuit has a first terminal for receiving power, a second terminal for coupling to the second end of the light emitting device string to control the current through the light emitting device string, a third terminal for generating the local feedback signal, a fourth terminal for coupling to ground, and a fifth terminal for receiving a dimming signal to adjust current through the light emitting device string.

11. The light emitting module of claim 10, wherein the local circuit further includes a sixth terminal for outputting a phase-shifted dimming signal generated by phase-shifting the dimming signal received from the fifth terminal.

12. A light emitting module for use in a flat panel display (FPD), the light emitting module comprising:
at least one light emitting device string, each light emitting device string having one or more light emitting devices connected in series, and each light emitting device string having a first end and a second end, wherein the first end is coupled to the output voltage for receiving power; and
a local circuit for controlling current through the light emitting device string and generating a local feedback signal, wherein the local circuit has a first terminal for receiving power, a second terminal for coupling to the second end of the light emitting device string to control the current through the light emitting device string, a third terminal for generating the local feedback signal, a fourth terminal for coupling to ground, and a fifth terminal for outputting a local fault signal to indicate a fault condition.

13. A light emitting module for use in a flat panel display (FPD), the light emitting module comprising:
at least one light emitting device string, each light emitting device string having one or more light emitting devices connected in series, and each light emitting device string having a first end and a second end, wherein the first end is coupled to the output voltage for receiving power; and
a local circuit for controlling current through the light emitting device string and generating a local feedback signal, wherein the local circuit has a first terminal for receiving power, a second terminal for coupling to the second end of the light emitting device string to control the current through the light emitting device string, a third terminal for generating the local feedback signal, and a fourth terminal for coupling to ground, wherein the local circuit further receives serial data for adjusting an internal parameter of the local circuit.

14. The light emitting module of claim 13, wherein the serial data is delivered by an inter-integrated circuit (I2C) data bus or a one-wire data bus.

15. The light emitting module of claim 14, wherein the one-wire data bus includes: an asynchronous data bus, a secure sockets layer (SSL) data bus, or a tri-state data bus.

16. A light emitting module for use in a flat panel display (FPD), the light emitting module comprising:
at least one light emitting device string, each light emitting device string having one or more light emitting devices connected in series, and each light emitting device string having a first end and a second end, wherein the first end is coupled to the output voltage for receiving power; and
a local circuit for controlling current through the light emitting device string and generating a local feedback signal, wherein the local circuit has a first terminal for receiving power, a second terminal for coupling to the second end of the light emitting device string to control the current through the light emitting device string, a third terminal for generating the local feedback signal, a fourth terminal for coupling to ground, a current source for controlling the current through the light emitting device string via the second terminal, and a sink-only voltage follower for generating the local feedback signal according to a voltage at the second terminal.

17. An integrated circuit for use in a light emitting module, for connecting to at least one light emitting device string, the integrated circuit comprising:

a current source for controlling current through the light emitting device string via a node; and a sink-only voltage follower, which generates a local feedback signal according to a voltage at the node.

18. The integrated circuit of claim 17, further comprising an open detection circuit, which compares the voltage at the node with a first reference voltage to determine whether the light emitting device string is open-circuited.

19. The integrated circuit of claim 18, further comprising a logic gate having a first input coupled to a start-up indication signal indicating system start-up, and a second input coupled to an output of the open detection circuit, the logic gate generating an output for determining whether the local feedback signal is outputted from the integrated circuit.

20. The integrated circuit of claim 17, wherein the current source is a controllable current source, which is controlled by a dimming signal.

21. The integrated circuit of claim 17, wherein the current source is a controllable current source, and wherein the integrated circuit further comprises: a phase-shift dimming circuit, which receives a dimming signal, and generates a phase-shifted dimming signal, wherein the dimming signal or the phase-shifted dimming signal is used for controlling the controllable current source.

22. The integrated circuit of claim 17, further comprising a short detection circuit, which compares the node voltage with a second reference voltage to determine whether the light emitting device string is short-circuited.

23. The integrated circuit of claim 17, further comprising a serial data bus decoder or a one-wire data bus decoder for receiving and decoding serial data, the serial data being for adjusting an internal parameter of the integrated circuit.

* * * * *